D. T. WILLIAMS.
AIR SUPPLYING ATTACHMENT FOR FURNACES.
APPLICATION FILED JUNE 28, 1913.
1,164,437.
Patented Dec. 14, 1915.
3 SHEETS—SHEET 1.
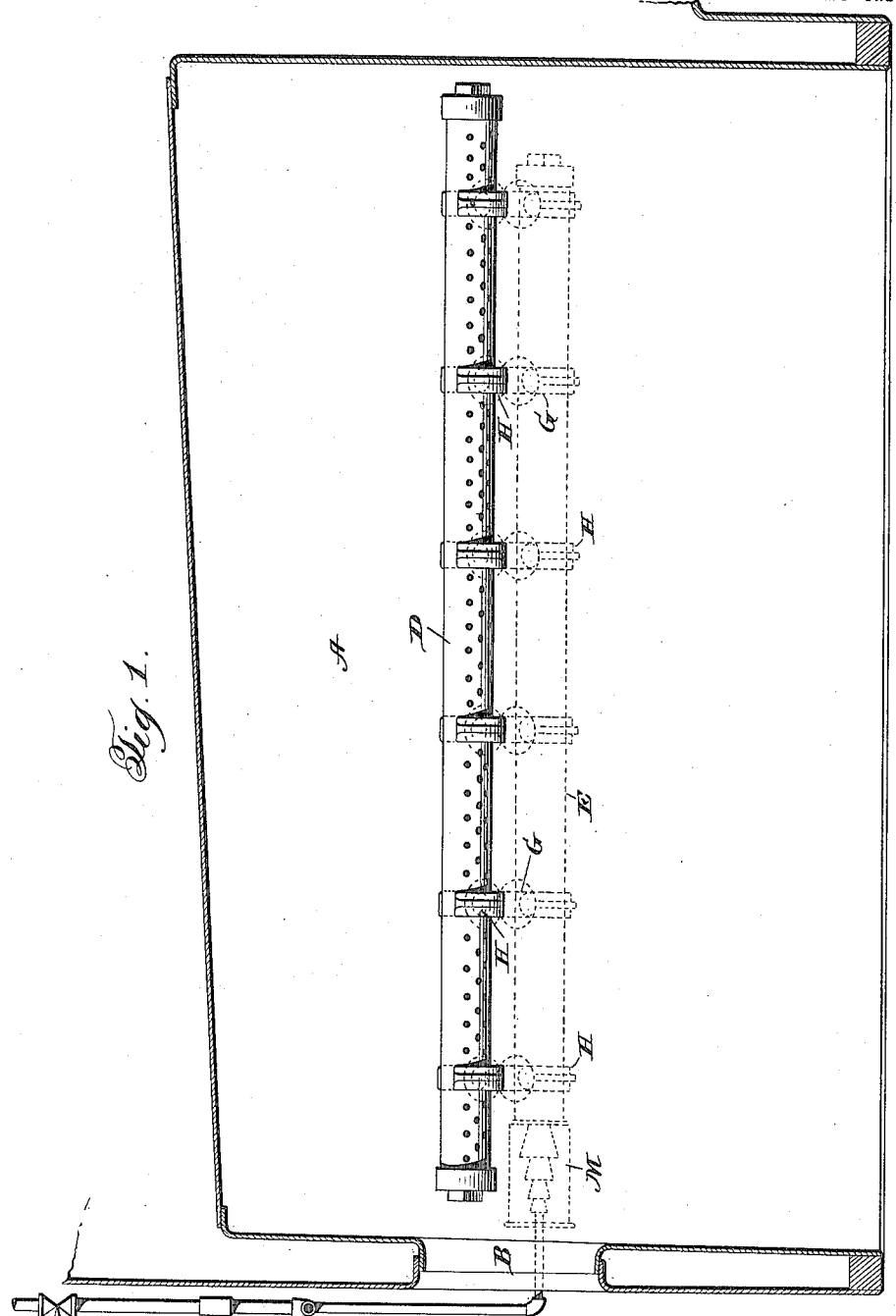

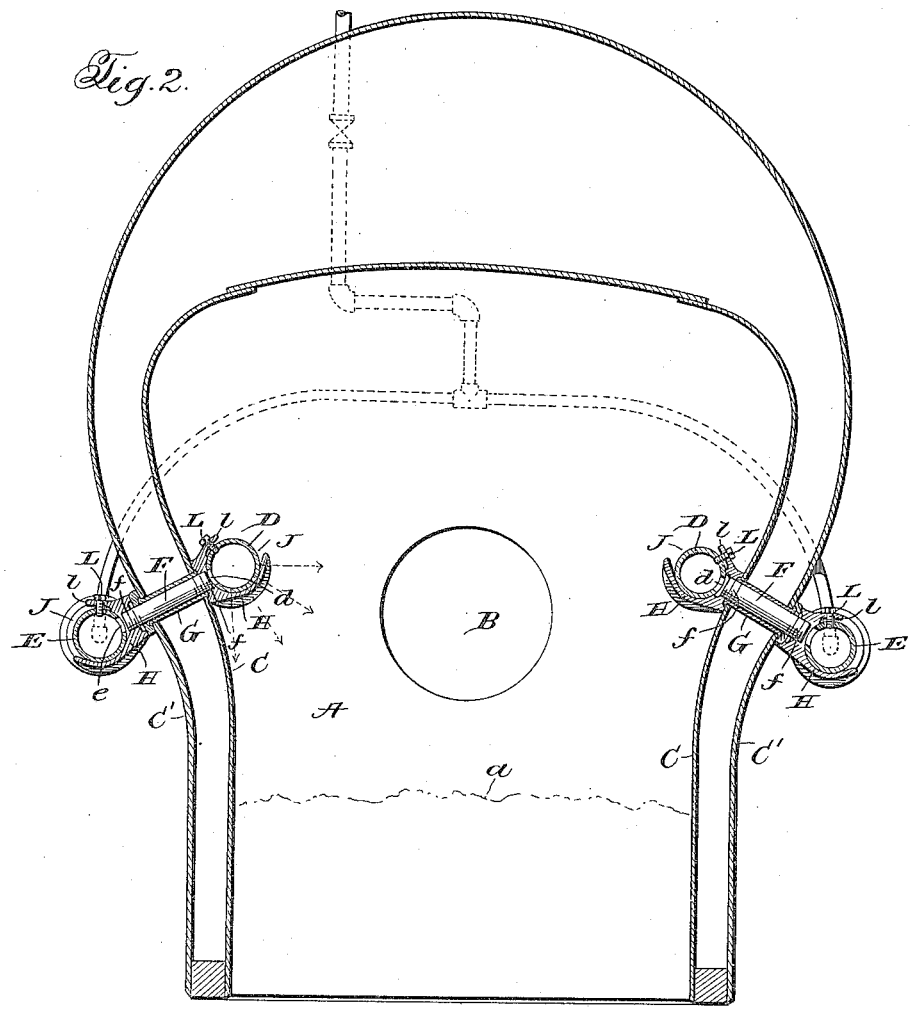

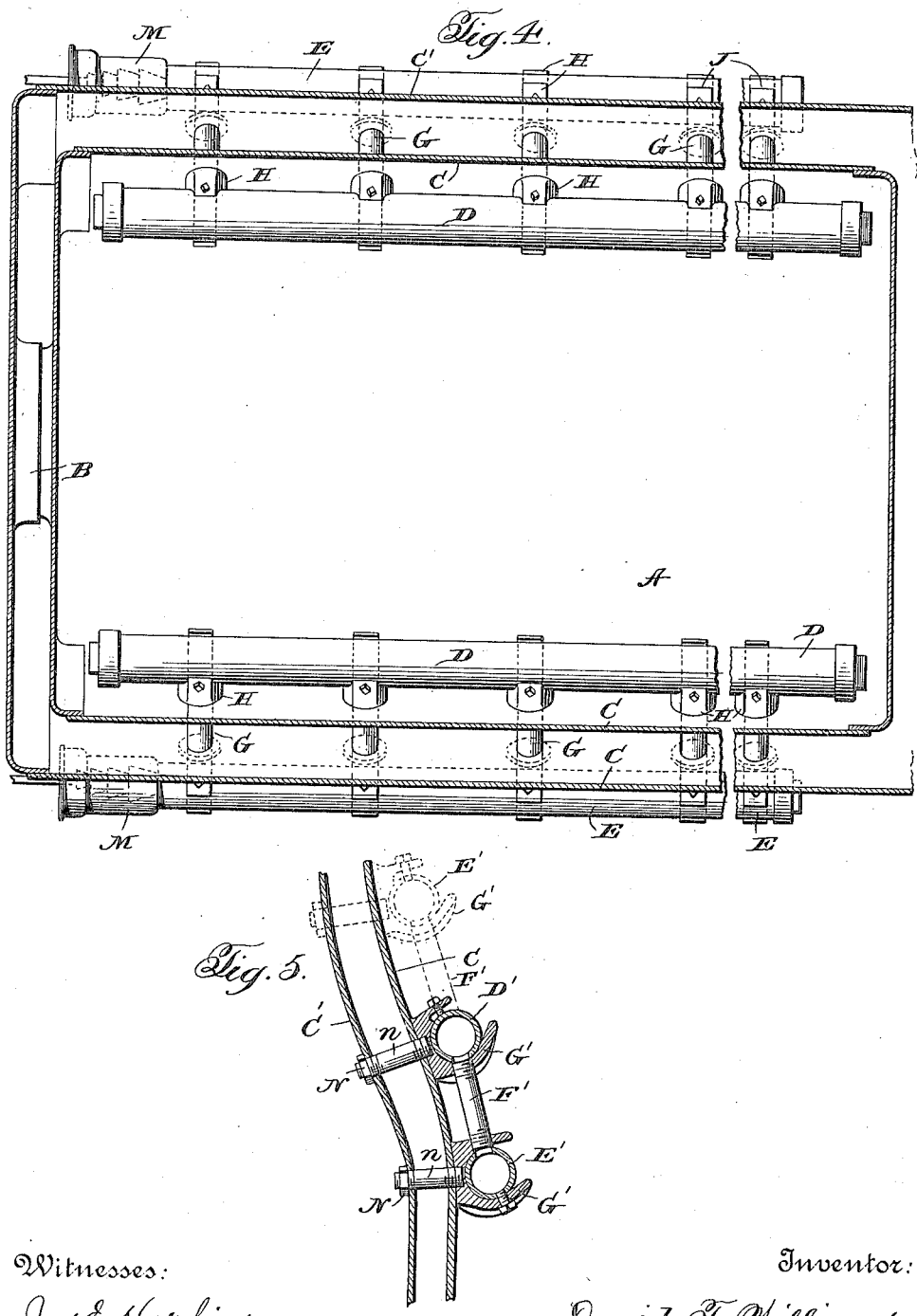

UNITED STATES PATENT OFFICE.

DAVID T. WILLIAMS, OF PATERSON, NEW JERSEY, ASSIGNOR, BY MESNE ASSIGNMENTS, TO DAVID T. MARVEL, JOSIAH MARVEL, AND JOSIAH O. WOLCOTT, COPARTNERS TRADING UNDER THE FIRM-NAME OF MARVEL, MARVEL & WOLCOTT.

AIR-SUPPLYING ATTACHMENT FOR FURNACES.

1,164,437.             Specification of Letters Patent.    Patented Dec. 14, 1915.

Application filed June 28, 1913. Serial No. 776,232.

*To all whom it may concern:*

Be it known that I, DAVID T. WILLIAMS, a subject of the King of Great Britain, residing at Paterson, in the county of Passaic and State of New Jersey, have invented certain new and useful Improvements in Air-Supplying Attachments for Furnaces, of which the following is a specification, reference being had therein to the accompanying drawing.

This invention relates to air-injecting attachments for furnaces and has for its object, the provision of a simple, inexpensive and efficient device of the character stated adapted to discharge air in a multitude of jets in divers directions into the combustion area of a furnace above the bed of fuel to agitate and thoroughly commingle the arising products of combustion with the air, to the end that substantially complete combustion may be obtained with correspondingly increased efficiency of the furnace, and the emission of smoke eliminated.

It is well recognized that in order to produce perfect combustion, it is necessary to supply a requisite volume of air or oxygen above the fire in order to transform the carbon-monoxid (CO) into carbon-dioxid ($CO_2$) but supplementing the mere supply of the volume of air, it is obvious that the air must be thoroughly mixed with the gases arising from the fuel bed to afford a combustible mixture throughout and prevent the escape of unconsumed and combustible products arising or drawn off from the bed of fuel by the usual draft through the furnace. These desirable characteristics are possessed by my improved attachment, as will be more fully explained in the specific description hereinafter contained when read in connection with the accompanying drawings forming a part hereof, and wherein the preferred embodiment of the invention is illustrated.

The invention further has for its object, the furnishing of certain improvements in detail of construction and arrangement of parts constituting characteristics of said preferred embodiment of the invention including a main supply chamber, a heating chamber, and a series of conduits connecting said chambers, the heating chamber being provided with a multitude of jet orifices substantially throughout the length thereof and in different angular relations adapted to discharge the heated air in corresponding directions throughout the combustion area of the furnace above the fuel, to agitate the combustible gases arising from the latter and effectively commingle therewith. Also, the provision of brackets for supporting the main supply and heating chambers connected together by means of the conduits constituting the communicating passages between said chambers. These and subsidiary features will more fully hereinafter appear.

In the drawings:—Figure 1 is a fragmentary longitudinal section through an ordinary locomotive fire box and boiler showing my attachment applied thereto; Fig. 2 is a vertical sectional view through Fig. 1; Fig. 3 is an enlarged cross sectional view of the attachment with its immediately associated parts; Fig. 4 is a horizontal section through the furnace looking down on the attachment, and Fig. 5 is a vertical sectional view showing a modified construction, constituting an embodiment of the invention other than that disclosed in the preceding figures.

Referring more specifically to the drawings, wherein like reference characters designate corresponding parts in the several views, and first with reference to that form of construction illustrated in the first four figures of the drawings, A represents the fire box of an ordinary locomotive furnace, B the door opening through which the fuel is fed to the fire box, and C, C' the inner and outer boiler sheets respectively.

Disposed along the sides of the fire box on the inside of the same, in planes approximately that of the upper part of the door opening, are a pair of oppositely disposed combined air heating and discharge pipes D arranged longitudinally of the fire box and extending substantially throughout the length of the latter, these pipes being provided with a multitude of jet orifices, conveniently arranged in rows radially of the pipes (four rows being shown) adapted to discharge air in different directions, as shown by the arrows, into the combustion area above the bed of fuel, the upper portion of which bed is approximately indicated at *a*. The combined air heating and discharge pipes D each receives its supply of air from a supply chamber constituted by a parallel pipe E extending along the outside of the fire box and communicating at a number of points with the pipe D through the medium of transverse pipes F, the opposite open ends of which register with openings $d$, $e$ respectively in the pipes D and E.

The parts above referred to are securely mounted in place and maintained in operative association in the following manner:— The boiler sheets C and C' are suitably perforated for the reception of sleeves or tubes G suitably secured thereto and of a size to permit the free introduction therethrough of the transverse connecting pipes F. The opposite ends of the pipes F are threaded as at $f$ to engage complementary threaded portions of similar brackets H hollowed out on the inner sides, as at $h$, to receive the turned-over ends $g$ of the tubes G and bear against the boiler sheet as at $h'$, or to bear against a hollow washer I adapted to overlie the end of the tube G, both clearly illustrated in Fig. 3. Each bracket is open at the top as at J for the ready insertion and removal of the supply and heating pipes D and E, and provided with curved seats K adapted to support said pipes with the openings $d$, $e$ thereof preserved in registration with the open ends of the transverse connecting pipes F by means of bolts or pins L passing through lugs $l$ on the brackets and into openings or notches $l'$ of the pipes D and E, as the case may be. At one end of the air receiver or reservoir E, preferably at the end thereof nearer the door of the fire box, I provide an air blower or injector M adapted to forcibly introduce the air into the receiver and from the receiver through the communicating passages F to the heating chamber D.

As distinguished from the construction above described, the air reservoir or receiver represented at E', in Fig. 5, constitutes a preliminary heater by reason of its location also within the fire box A along the side thereof, it being observed that in this instance as well as in the instance previously defined, two attachments are employed, one at each side of the fire box. The receiver E' in the present instance is connected to the combined heater and discharge pipe D' by approximately vertically disposed connecting pipes F', independent brackets G' being employed, in this instance, clamped in place to the boiler sheets by cap-nuts N engaging the outer threaded ends of supporting bolts $n$ in lieu of the outer bracket H in the first described construction.

From the foregoing disclosure, it will be apparent that air forcibly supplied to the receiving and storage chamber within the pipe E or pipe E' will be quickly and uniformly fed to the combined heating and discharge pipe D or D' through the medium of the many communicating passages between the receiver E or E' and the pipe D or D', constituted by the connecting pipes therebetween, F or F', as the case may be, and the air highly heated and expanded in the pipe D or D',—superheated in the embodiment of my invention illustrated in Fig. 5,—will be ejected horizontally across the fire box and downwardly and inwardly from opposite directions and at various angles toward the body of fuel within the combustion area to effectually agitate the products of combustion arising from the bed of fuel, and insure thorough commingling of the air with the gases and other combustible products, to enable consumption of the latter, resulting in the practically complete combustion of fuel, increased efficiency in operating results of the furnace, and the prevention of smoke, all as previously pointed out.

While I have herein disclosed special embodiments of the invention desired to be protected herein, it will be apparent to persons skilled in the art that the invention is capable of embodiment in other devices and arrangements, as may be in keeping with the hereto appended claims.

I claim:—

1. In combination with the fire box of a furnace, an elongated air receiving chamber, a similar air heating and discharge chamber arranged along the inner side of the fire box adapted to emit air laterally into the combustion area above the bed of fuel, and a plurality of tubular members constituting communicating passages between the air receiving chamber and the combined air heating and discharge chamber, substantially as described, said tubular members bearing brackets on which one of the chambers is removably supported.

2. In combination with the fire box of a furnace, an elongated air receiving chamber, a similar air heating and discharge chamber arranged along the inner side of the fire box adapted to emit air laterally into the combustion area above the bed of fuel, and a plurality of tubular members constituting communicating passages between the air receiving chamber and the combined air heating and discharge chamber, the air receiving chamber being arranged along the outside of the fire box and the communicating passages extending through the wall of the fire box and said tubular members bearing brackets on which one of the chambers is removably supported.

3. In combination with the fire box of a furnace, an elongated air receiving chamber, a similar air heating and discharge chamber arranged along the inner side of the fire box adapted to emit air laterally into the combustion area above the bed of fuel, and a plurality of tubular members constituting communicating passages between the air receiving chamber and the combined air heating and discharge chamber, the air heating and discharge chamber being provided with a multitude of discharge orifices to emit the air therefrom in divers directions to agitate and commingle with the combustible products arising from the bed of fuel, and said tubular members bearing brackets on which one of the chambers is removably supported.

4. In combination with the fire box of a furnace, an elongated air receiving chamber, a similar air heating and discharge chamber arranged along the inner side of the fire box adapted to emit air laterally into the combustion area above the bed of fuel, a plurality of communicating passages between the air receiving chamber and the combined air heating and discharge chamber, and detachable brackets carried by the attachment and constituting clamps for fastening the attachment to the fire box.

5. In combination with the fire box of a furnace, an elongated air receiving chamber, a similar air heating and discharge chamber arranged along the inner side of the fire box adapted to emit air laterally into the combustion area above the bed of fuel, a plurality of communicating passages between the air receiving chamber and the combined air heating and discharge chamber, and separate detachable brackets for supporting the air receiving and the air heating chambers in place, said brackets constituting opposing clamping members.

6. In combination with the fire box of a furnace, an elongated air receiving chamber, a similar air heating and discharge chamber arranged along the inner side of the fire box adapted to emit air laterally into the combustion area above the bed of fuel, a plurality of communicating passages between the air receiving chamber and the combined air heating and discharge chamber, separate detachable brackets for supporting the air receiving and the air heating chambers in place, and means on said brackets for preserving the chambers in registration with the communicating passages therebetween.

7. In combination with the fire box of a furnace, an elongated air receiving chamber, a similar air heating and discharge chamber arranged along the inner side of the fire box adapted to emit air laterally into the combustion area above the bed of fuel, a plurality of communicating passages between the air receiving chamber and the combined air heating and discharge chamber, separate detachable brackets for supporting the air receiving and the air heating chambers in place, and means on said brackets for preserving the chambers in registration with the communicating passages therebetween, said means comprising a projection on the bracket adapted to engage a recessed portion of the chamber members.

8. In combination with the fire box of a furnace, an elongated air receiving chamber, a similar air heating and discharge chamber arranged along the inner side of the fire box adapted to emit air laterally into the combustion area above the bed of fuel, and a plurality of communicating passages between the air receiving chamber and the combined air heating and discharge chamber, the air receiving chamber being arranged along the outside of the fire box and the communicating passages extending through the wall of the fire box, said communicating passages comprising pipes passing through the said wall registering with openings in the air receiving and air heating chambers, sleeves connecting the inner and outer boiler sheets through which said pipes pass, and means engaging the ends of the pipes over the sleeves to support the chambers in place.

9. In combination with the fire box of a furnace, an elongated air receiving chamber, a similar air heating and discharge chamber arranged along the inner side of the fire box adapted to emit air laterally into the combustion area above the bed of fuel, and a plurality of communicating passages between the air receiving chamber and the combined air heating and discharge chamber, the air receiving chamber being arranged along the outside of the fire box and the communicating passages extending through the wall of the fire box, said communicating passages comprising pipes passing through the said wall registering with openings in the air receiving and air heating chambers, in combination with brackets detachable relative to each other connected to said connecting pipes and having seats for the air receiving and air heating chambers.

10. In combination with the fire box of a furnace, an elongated air receiving chamber, a similar air heating and discharge chamber arranged along the inner side of the fire box adapted to emit air laterally into the combustion area above the bed of fuel, and a plurality of communicating passages between the air receiving chamber and the combined air heating and discharge chamber, the air receiving chamber being arranged along the outside of the fire box and the communicating passages extending through the wall of the fire box, said communicating passages comprising pipes passing through the said wall registering with openings in the air receiving and air heating chambers, in combination with brackets detachable relative to each other connected to said connecting pipes and having seats for the air receiving and air heating chambers, said brackets having open portions for the introduction of the chambers thereinto, and means for preventing disarrangement of the chambers.

11. In combination with the fire box of a furnace, an elongated air receiving chamber, a similar air heating and discharge chamber arranged along the inner side of the fire box adapted to emit air laterally into the combustion area above the bed of fuel, and a plurality of communicating passages between the air receiving chamber and the combined air heating and discharge chamber, the air receiving chamber being arranged along the outside of the fire box and the communicating passages extending through the wall of the fire box, said communicating passages comprising pipes passing through the said wall registering with openings in the air receiving and air heating chambers, in combination with brackets detachable relative to each other connected to said connecting pipes and having seats for the air receiving and air heating chambers, and sleeves passing through the inner and outer boiler sheets adapted to receive the communicating pipes therethrough, said sleeves being upset at one end over an adjacent boiler sheet and the adjacent bracket being provided with recessed body to accommodate said upset end.

In testimony whereof I affix my signature in presence of two witnesses.

DAVID T. WILLIAMS.

Witnesses:
W. MASON ALLEN,
PAUL W. TAYLOR.

Copies of this patent may be obtained for five cents each, by addressing the "Commissioner of Patents Washington, D. C."